Jan. 1, 1935.   M. J. BALDWIN   1,986,616
RECTILINEAR MOTOR
Filed March 6, 1934   2 Sheets-Sheet 1
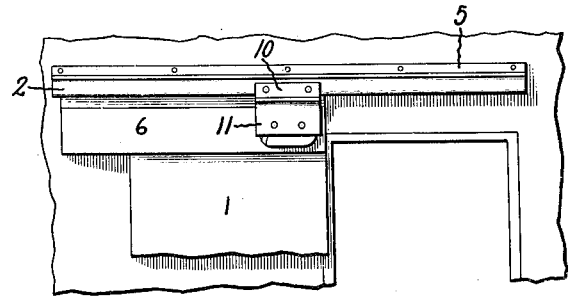
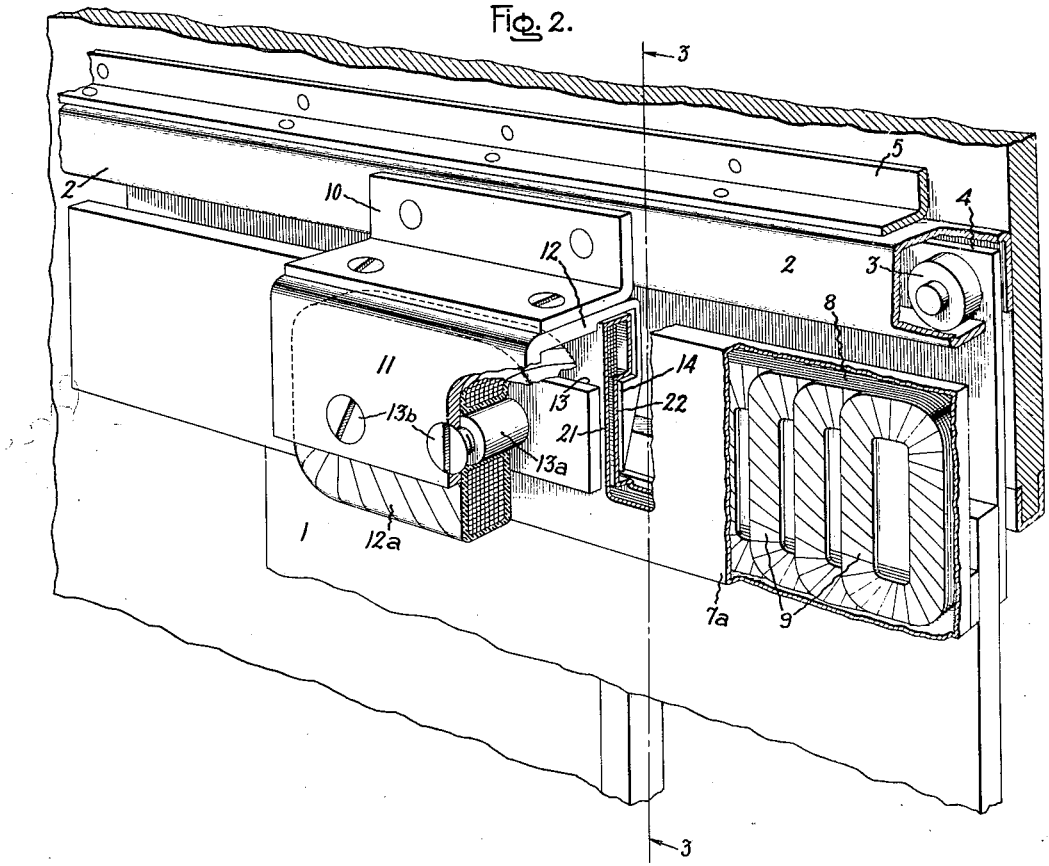
Inventor:
Morris J. Baldwin,
by Harry E. Dunham
His Attorney.

Jan. 1, 1935.  M. J. BALDWIN  1,986,616
RECTILINEAR MOTOR
Filed March 6, 1934  2 Sheets-Sheet 2
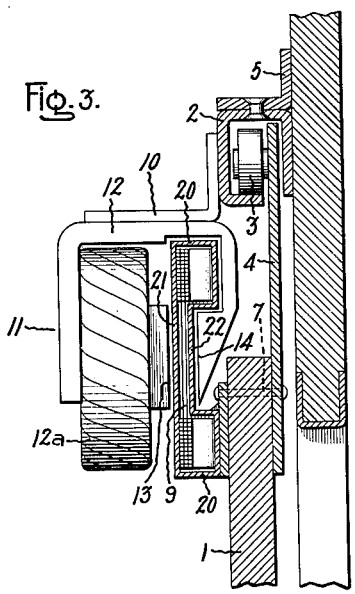
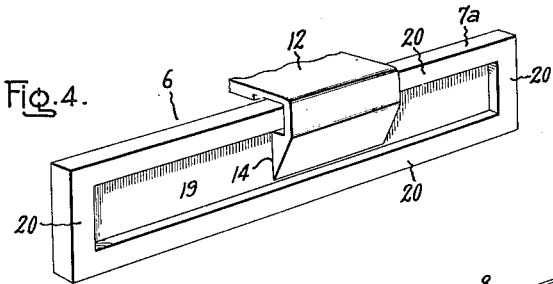
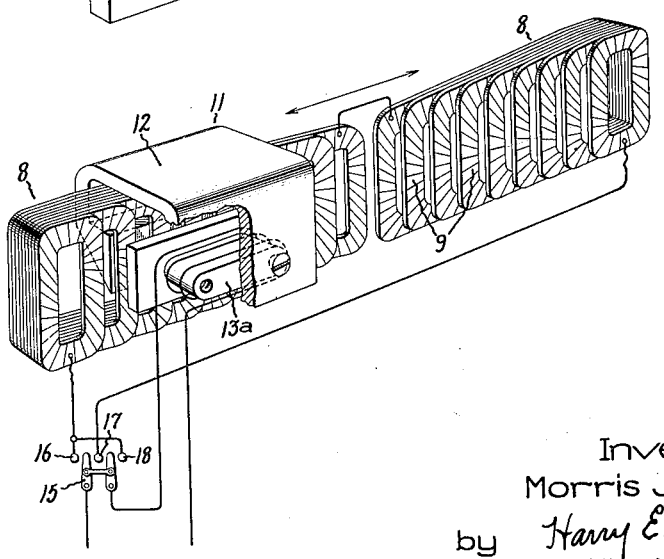
Inventor:
Morris J. Baldwin,
by Harry E. Dunham
His Attorney.

Patented Jan. 1, 1935

1,986,616

UNITED STATES PATENT OFFICE 1,986,616

RECTILINEAR MOTOR

Morris J. Baldwin, Harborcreek, Pa., assignor to General Electric Company, a corporation of New York Application March 6, 1934, Serial No. 714,284

7 Claims. (Cl. 172—290)

My invention relates to rectilinear electric motors of a type suitable for operating sliding doors and the like.

An object of my invention is to provide a rectilinear motor of simple construction which is adapted for use on alternating or direct current.

Further objects and advantages of my invention will become apparent as the description proceeds, and the features of novelty which characterize my invention will be pointed out in the claims annexed to and forming a part of this specification.

For a better understanding of my invention reference may be had to the accompanying drawings in which Fig. 1 is an elevation of a motor embodying my invention applied to a sliding door; Fig. 2 is an enlarged perspective view partly broken away showing details of the motor construction and door mounting shown in Fig. 1; Fig. 3 is a sectional view taken on the line 3—3 of Fig. 2; Fig. 4 is a perspective view of the armature taken from the rear; and Fig. 5 is a diagrammatic view showing the construction of the armature winding and the electrical connections of the armature and field windings.

I have shown a motor embodying my invention used to operate a door 1, which is carried on a track 2 by rolls 3 secured to a plate 4 attached to the side of the door by bolts 7, as shown in Fig. 3. The track is attached to the upper door frame member by an angle 5. The armature 6 of the motor is fastened directly to the front of the door by the bolts 7, and transmits force directly to the door. By this arrangement, the door supporting members 2, 3, and 4 support the armature 6 and guide the movement of the armature.

As shown in the drawings, the armature 6 of the motor is provided with an enclosing casing 7a. The provision of an enclosing casing for the armature of a rectilinear motor is not my invention, but is the invention of Felix Konn, and is described and claimed in his copending application Serial No. 746,809, filed October 4, 1934, and assigned to the General Electric Company, the assignee of my present invention.

The enclosing casing 7a has a reduced central rectangular section 19 and enlarged sections 20 at the top and bottom and at each end, and within this casing is placed a winding made up of two groups of flat coils 8, the coils of each group having progressively increasing pitch. The coils are connected in series, and the coil sides 9 which carry current in the same direction are distributed transversely along the reduced central section 19 of the enclosing casing and produce the effect of a uniformly distributed current sheet flowing transversely of the armature. Plates 21 and 22 of the casing extend along either side of the coil sides 9 and retain the coil sides 9 in position and prevent lateral displacement thereof. Each of the plates 21 and 22 has a surface adjacent the coil sides 9 and an opposite surface which is adjacent one of the poles of the field of the motor. It is desirable that the active portion of the armature be as thin as possible and of uniform thickness. This object is attained in armatures constructed in accordance with my invention by arranging the active conductors 9 between the parallel plates 21 and 22, which define the reduced portion 19 of the enclosing casing. The remaining sides of the coils are grouped in the enlarged sections 20 of the casing at the top and bottom and at the ends thereof. The reduced section 19 of the enclosing casing 7a is arranged between the poles of a field magnet 11.

The field magnet 11 comprises a U-shaped yoke 12 having an exciting winding 12a and opposed magnetic pole portions having faces 13 and 14 extending closely adjacent the opposite sides of the reduced portion of the armature casing. The pole portion having a face 14 at the rear of the field magnet is integral with yoke 12 and extends into the depression 19 at the rear of the enclosing casing of the armature. The pole portion having a face 13 is attached by bolts 13b to a pole body 13a on which the winding 12a is arranged. The field magnet 11 is attached to the door-supporting track 2 by a bracket 10. By this arrangement the track 2 supports and guides the door in its opening and closing movements and also supports and guides the armature 6 between the pole portions of the field magnet. This arrangement also makes the mounting and alignment of the motor simple and accurate.

As shown in Fig. 5, the field coil 12a of the field magnet is connected in series with the coils 8 of the armature through a reversing switch 15. By moving the reversing switch 15 to close on contacts 16 and 17 or on contacts 17 and 18, the direction of the field flux with respect to the armature current may be changed to change the direction of movement of the armature as desired. When contacts 16 and 17 are closed, the armature moves to the left as viewed in Figs. 2 and 5, and when contacts 17 and 18 are closed, the armature moves to the right.

The force exerted by the motor is obtained by the reaction of the armature conductors between the pole portion faces 13 and 14 with the flux which passes between the pole portion faces. Since the coil sides 9 are uniformly distributed throughout the length of the armature, as shown in Figs. 2 and 5, only part of the armature conductors are active in producing a force at any instant, but uniform force is obtained throughout the travel of the armature. The field flux and the current in the armature conductors are substantially in phase with each other so that the motor may be used with either alternating or direct current. The direction of movement of the armature is controlled by switch 15. When contacts 16 and 17 are closed, the armature moves to the left to open the door and when contacts 17 and 18 are closed, the armature moves to the right to close the door.

Although I have shown a particular embodiment of my invention, I do not desire to be limited to the construction described, and I intend in the appended claims to cover all modifications which do not depart from the spirit and scope of my invention.

What I claim as new and desire to secure by Letters Patent of the United States, is:

1. A rectilinear motor comprising means for producing a field flux, a rectilinear armature extending transversely of said field flux, a winding for said armature having a plurality of series-connected coils, active coil sides of said winding carrying current in the same direction being distributed transversely along the length of said armature and the remaining coil sides being grouped along the upper and lower edges of said armature and at an end of said armature respectively, and means for supporting and guiding said armature.

2. A rectilinear motor comprising a field magnet having pole portions, a rectilinear armature extending between said pole portions, a winding for said armature having a plurality of series-connected coils, active coil sides of said winding carrying current in the same direction being distributed transversely along the length of said armature and the remaining coil sides being grouped along the upper and lower edges of said armature and at an end of said armature respectively, and means for supporting and guiding said armature with respect to said pole portions.

3. A rectilinear motor comprising a field magnet having pole portions, means including a field coil for exciting said field magnet, a rectilinear armature extending between said pole portions, a winding for said armature having a plurality of series-connected coils, active sides of said coils carrying current in the same direction being distributed transversely along the length of said armature and the remaining coil sides being grouped along the upper and lower edges of said armature and at an end of said armature respectively, said field coil and said armature coils being connected in series, and means for supporting and guiding said armature with respect to said pole portions.

4. A rectilinear motor comprising a field magnet having pole portions, a rectilinear armature having an enclosing casing with a reduced central section arranged between said pole portions, an armature winding having a plurality of series-connected coils, sides of said coils carrying current in the same direction being distributed transversely along said reduced section, and means for supporting and guiding said armature with respect to said pole portions.

5. A rectilinear motor comprising a field magnet having pole portions, means including a field coil for exciting said field magnet, a rectilinear armature having an enclosing casing with a reduced central section arranged between said pole portions, an armature winding having a plurality of series-connected coils, sides of said coils carrying current in the same direction being distributed transversely along said reduced section, said armature and said field coils being connected in series, and means for supporting and guiding said armature with respect to said pole portions.

6. A rectilinear armature comprising a winding for said armature having a plurality of series-connected coils, active coil sides of said winding carrying current in the same direction being distributed transversely along the length of said armature, and the remaining coil sides being grouped along the upper and lower edges of said armature and at an end of said armature respectively.

7. A rectilinear armature comprising an enclosing casing having a reduced central section, and a winding for said armature having a plurality of series-connected coils arranged in said casing, the sides of said coils carrying current in the same direction being distributed transversely along said reduced section and the remaining coil sides being grouped along the upper and lower edges of said armature and at an end of said armature respectively.

MORRIS J. BALDWIN.